INVENTORS.
Terence J. Cawley
Paul B. Kulik
BY
Walter S. Zebrowski
ATTORNEY

United States Patent Office 3,494,191
Patented Feb. 10, 1970

3,494,191
FLUID DRIVEN SURFACE LEVEL SENSING SYSTEM
Terence J. Cawley, Eldred, and Paul B. Kulik, Bradford, Pa., assignors to Corning Glass Works, Corning, N.Y., a corporation of New York
Filed Apr. 5, 1968, Ser. No. 719,190
Int. Cl. G01f 23/00
U.S. Cl. 73—290                                   7 Claims

ABSTRACT OF THE DISCLOSURE

An automatic control system for sensing and controlling liquid surface levels utilizing a vertically movable nozzle which issues a fluid downwardly in a stream against the surface being sensed. Pressure changes which occur in the nozzle due to the disturbance of the fluid stream as it impinges on the surface are detected by a Schmitt trigger fluidic device which in turn controls the direction of movement of the nozzle. The trigger controls the polarity of a power source applied to a reversible motor which moves the nozzle downwardly when the fluid pressure is less than a predetermined reference level and upwardly when in excess thereof.

The trigger switches to cause the nozzle to be lifted at a predetermined minimum distance from the surface, which distance being fixed, is a function of the surface level. The liquid surface level can be monitored by keeping track of the net rotational displacement of the motor drive shaft.

BACKGROUND OF THE INVENTION

Several different types of level sensing systems are known in the prior art such as flotation systems, electrical contact systems, immersion or "bubbler" systems, radiation detection systems, sonic detection systems, electrical reactance systems, and the like. The utility of each of these types of systems is highly dependent upon the physical properties of the liquidous materials whose surface level is to be sensed. Physical properties of materials which affect the sensing system being employed include chemical reactivity, viscosity, volatility, electrical conductivity, electrical reactance, and the like.

For example, flotation sensing systems are generally impractical to use with high temperature liquids as well as those having high chemical reactivity. The latter problem is encountered to some degree in almost all sensing systems which involve direct contact with the liquid whose surface level is being monitored. The accuracy of electrical contact type sensing systems is often affected by the wetting of the electrical contacts by the liquid being sensed. Changes in surface conductivity, ionization, and stray electrical currents also contribute to these inaccuracies. Naturally the electrical contact type systems are restricted to use with liquids which are electrically conductive. Immersion type systems are known to vary in their accuracy due to changes in the physical character of the liquids being sensed which affect the physical resistance to the flow of fluids from the system to the liquid. Sonic detection systems encounter variations in accuracy due to temperature changes which affect the density of the atmosphere through which sonic signals must propagate. Electrical reactance systems tend not only to detect liquid level changes but also changes in extraneous factors such as atmospheric dielectric constants above the liquid, ionization factors, and other complex phenomena which contribute to inaccuracy. Finally, radiation type systems are often of a highly complex nature requiring elaborate equipment which must be carefully calibrated prior to use. This complexity is often reflected in the high costs of such systems.

We have developed a highly accurate liquid level sensing system which does not make physical contact with the liquid being sensed. Moreover, our sensing system is useful quite independently of the nature of the particular liquid being handled. The traditional problems of high viscosity, corrosiveness, chemical reactivity, temperature, lack of electrical conductivity, nuclear activity, and the like are of little concern insofar as the applicability of our system is concerned. In addition our sensing system utilizes readily available components which contribute substantially to its low cost of construction.

SUMMARY OF THE INVENTION

Accordingly, it is an object of the instant invention to provide a fluid driven surface level sensing system which does not require touching or penetration of the surface being sensed.

It is a further object of the instant invention to provide a surface level sensing system which is applicable to a wide variety of liquids and solids without regard to many of the physically limiting properties of such liquids and solids.

Briefly, in accordance with the instant invention, in a liquid level sensing system, a nozzle means is provided for issuing a fluid downwardly toward the surface of a liquid. A substantially constant pressure fluid source supplies fluid to a fluid conducting means which in turn supplies the fluid, under pressure, to the nozzle means. Means is provided for detecting a change in the pressure of the fluid in the nozzle means which is operatively associated with means for vertically moving the nozzle in response to the fluid pressure.

Additional objects, features, and advantages of the instant invention will become obvious to those skilled in the art from the following detailed description and attached drawings on which, by way of example, only the preferred embodiment of the instant invention is illustrated.

DESCRIPTION OF THE PREFERRED EMBODIMENTS

Figure 1:
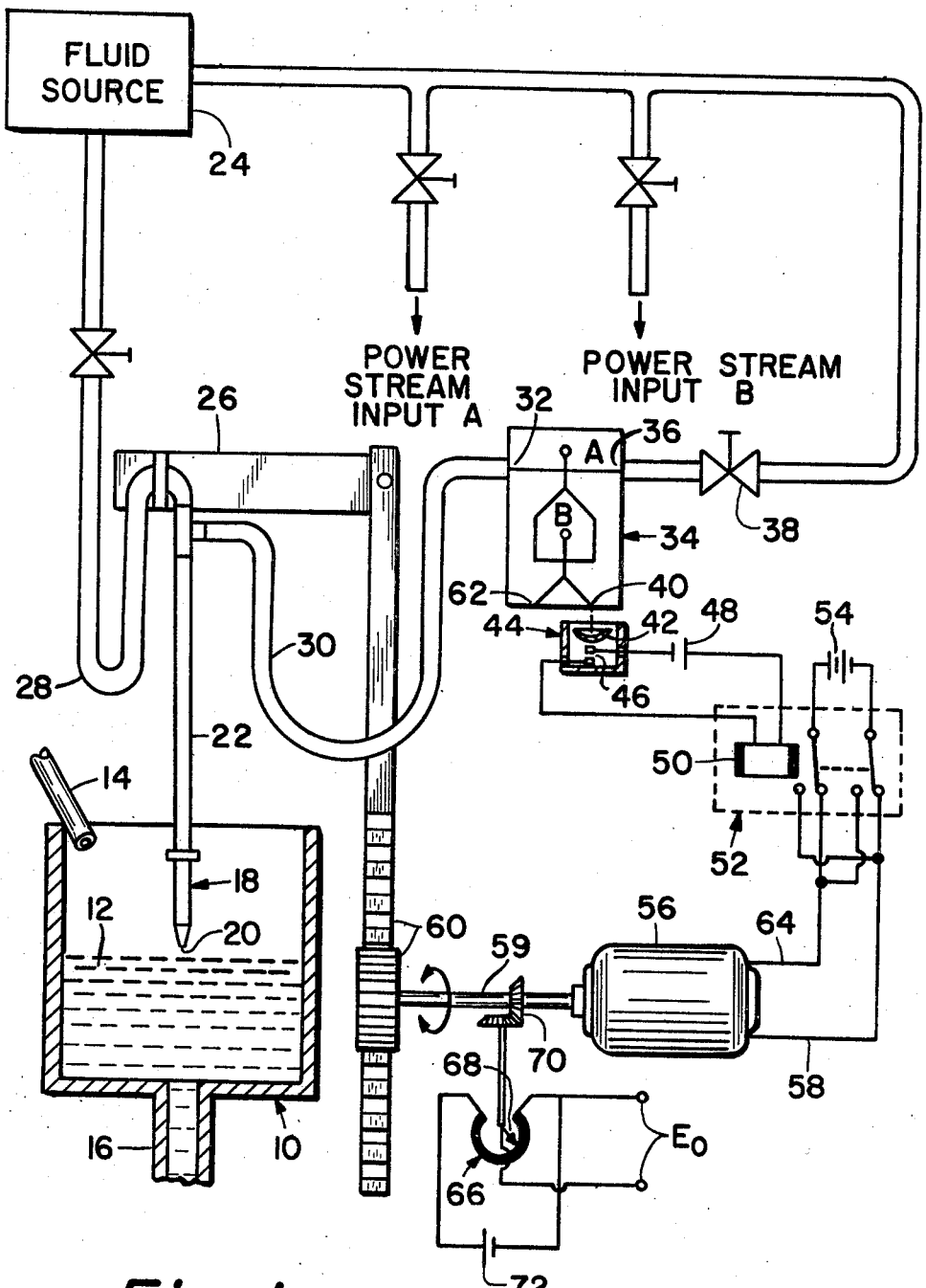
FIGURE 1 illustrates schematically one embodiment of the instant invention.

Referring to FIGURE 1 there is shown a vessel 10 suitable for containing a liquid 12 whose surface level, in relation to a fixed reference level, is to be sensed in accordance with the instant invention. In a conventional manner, the liquid 12 is supplied to the vessel 10 through a valve controlled inlet pipe 14 and removed through a valve controlled drain pipe 16.

A liquid level sensing element 18 in the form of a hollow cylindrical member, jet, nozzle, or the like is suspended above the surface of the liquid 12 so as to issue a fluid, supplied thereto under pressure, from an outlet orifice 20 downwardly toward the surface of the liquid 12 preferably in a jet stream of laminar flow profile. The element 18 of the instant example is suspended from its fluid input end by a flexible fluid conducting conduit 22 which also supplies fluid thereto under pressure from a pressure regulated fluid source 24. At a suitable height above the sides of the vessel 10, the conduit 22 is fastened or secured in any convenient manner to a vertically movable supporting member 26. An excessive length of the conduit 22 is provided which hangs from the member 26 in a loop 28 to avoid stretching or pulling of the conduit 22 when the element 18 is extended to its lowest level in the vessel 10. As will be readily appreciated by those skilled in the art, that portion of conduit 22 suspended from member 26 leading to element 18 may be rigid if desired.

The sensing system of the instant invention utilizes the change in pressure that occurs in the element 18 and is transmitted back through the conduit 22 toward the source 24 when the orifice 20 approaches sufficiently close to the surface of the liquid 12 to cause disturbance of the flow profile of the fluid stream. Such fluid pressure changes occurring in the conduit 22 are transmitted through a flow line 30 to a first control port 32 of a conventional fluidic Schmitt trigger 34. Examples of fluidic Schmitt triggers may be found in U.S. Patent application Ser. No. 568,233 filed July 27, 1966 by R. H. Bellman and T. W. Bermel. A pair of fluid power streams are supplied to power stream inputs A and B of the trigger 34 as shown. A constant pressure fluid bias signal is supplied to a second control port 36 of the trigger 34 from the fluid source 24 at a suitable pressure as determined by the setting of a bias control valve 38. The valve 38 is set in such a manner that the bias signal at the control port 36 determines the fluid signal output state of the trigger 34 when there is insignificant back pressure in the element 18 and conduit 22, i.e., when the orifice 20 is remote with respect to the surface of the liquid 12 such that the emitted fluid stream is relatively undisturbed.

In the instant example, with no back pressure in the element 18, the bias signal at the control port 36 produces a fluid output signal at an output port 40 of the trigger 34. By any well known fluid conducting means such as a hose, not shown, the fluid signal at the output port 40 is directed toward a pressure sensitive diaphragm 42 of an electrical pressure switch 44, which depresses to engage a pair of normally open electrical contacts 46 which in turn energize a coil 50 of a double-pole double-thrown relay 52 with an electrical source 48. Accordingly, the switch 44 serves as a fluid pressure-to-electrical signal transducer. The relay 52 thereby applies a power source 54 to drive a reversible electric motor 56 with the positive terminal of the source 54 connected to a motor terminal line 58. In this state, the motor 56 drives a shaft 59 which in turn operates a rack and pinion assembly 60 so as to lower the element 18 toward the surface of the liquid 12. The lowering movement of the element 18 continues until the orifice 20 thereof approaches sufficiently close to the liquid 12 to develop back pressure in the element 18 and conduit 22 sufficient to switch the trigger 34 to output a fluid signal at an output port 62. The trigger 34 switches the output signal from the port 40 to the port 62 when the fluid pressure in the conduit 22 is sufficient to overcome the bias pressure at the control port 36. The bias pressure is therefore a predetermined reference pressure which can be adjusted as desired to produce the desired switching characteristics of the trigger 34. Upon overcoming bias, the fluid pressure on the diaphragm 42 is removed causing the contacts 46 to spring open which, in turn, de-energize the relay 52. Accordingly, the polarity of the power source 54 is reversed so as to place the positive terminal thereof on a motor terminal 64 and reverse the rotation of the motor 56 and rack and pinion assembly 60. The element 18 is therefore lifted away from the surface of the liquid 12 until the pressure in the conduit 22 reduces below the bias pressure level at which point the trigger 34 switches back to the lowering mode and thus completes a cycle of operation of the system.

Thus the system of the instant example tends to oscillate above a point which is a fixed minimum distance above the liquid 12, at which point back pressure in the element 18 produces switching of the trigger 34. It should be noted that a conventional piston and cylinder assembly may be used in place of the motor 56 and rack and pinion 60 to adjust the level of the element 18. In such a case the trigger 34 can be eliminated as the pressure in the conduit 22 can be sampled in any well known manner and the fluid employed to actuate a valve controlled air supply to drive the piston to lift the element 18 directly. In a similar manner the bias pressure can be used to drive the piston downwardly to lower the element 18 when the fluid pressure in the element 18 is less than the predetermined bias reference pressure. Accordingly, such well known and mechanically equivalent alternatives readily suggest themselves to those skilled in the art from a reading of the instant example and are to be recognized as fully within the scope of the instant invention.

Measurable information corresponding to the level of the orifice 20 is obtained in the instant example by an electrical potentiometer 66 of linear taper having a movable rotary contact 68 which is coupled to the motor shaft 59 through a set of bevel gears 70. A suitable voltage source 72 is applied across the potentiometer 66 providing a variable output voltage, indicated in FIGURE 1 as $E_o$ which corresponds in magnitude to the cumulative or net rotational displacement of the motor shaft 59. In a well known manner the output voltage $E_o$ is calibrated by measuring the displacement of the orifice 20 above or below any fixed reference level within the vessel 10 for any two output voltage values of $E_o$. The voltage $E_o$ may be fed to a calibrated chart recorder, oscilloscope, voltmeter, or other suitable and well known electrical instrument to enable an observer to read the level of the liquid 12. In addition to its use in monitoring the level of the liquid 12, the same voltage $E_o$ provides a signal capable of controlling the amount of the liquid 12 in the vessel 10 so as to maintain a fixed surface level as desired. In a well known manner the voltage $E_o$ can be used to control the valving of either the inlet pipe 14, the drain line 16 or both to supply and remove the liquid 12 as desired.

It is preferable to supply the driving fluid to the element 18 at a low or moderate flow rate so as not to cause splashing of the liquid 12 or to produce depression of the surface thereof upon which the emitted jet stream impinges. As will readily be appreciated the minimum fluid flow rate to the element 18 which is sufficient to produce a detectable back pressure therein to trigger the amplifier 34 depends on the dynamic characteristics of the element 18. Fluid flow rates of less than about 2.0 cubic feet/hour are preferred but greater flow rates can be utilized effectively. In one specific example a fluid was supplied to the element 18 at a flow rate of about 1.65 cubic feet/hour thereby triggering the Schmitt trigger 34 with a given adjustment of the bias control valve 38, the orifice 20 of the element 18 was at a distance of about 0.012 inches above a liquid at 25° C. By readjusting the bias control valve 38 switching could also be produced at the same distance above molten glass in a melt furnace at a temperature of 810° C.

Figure 2:
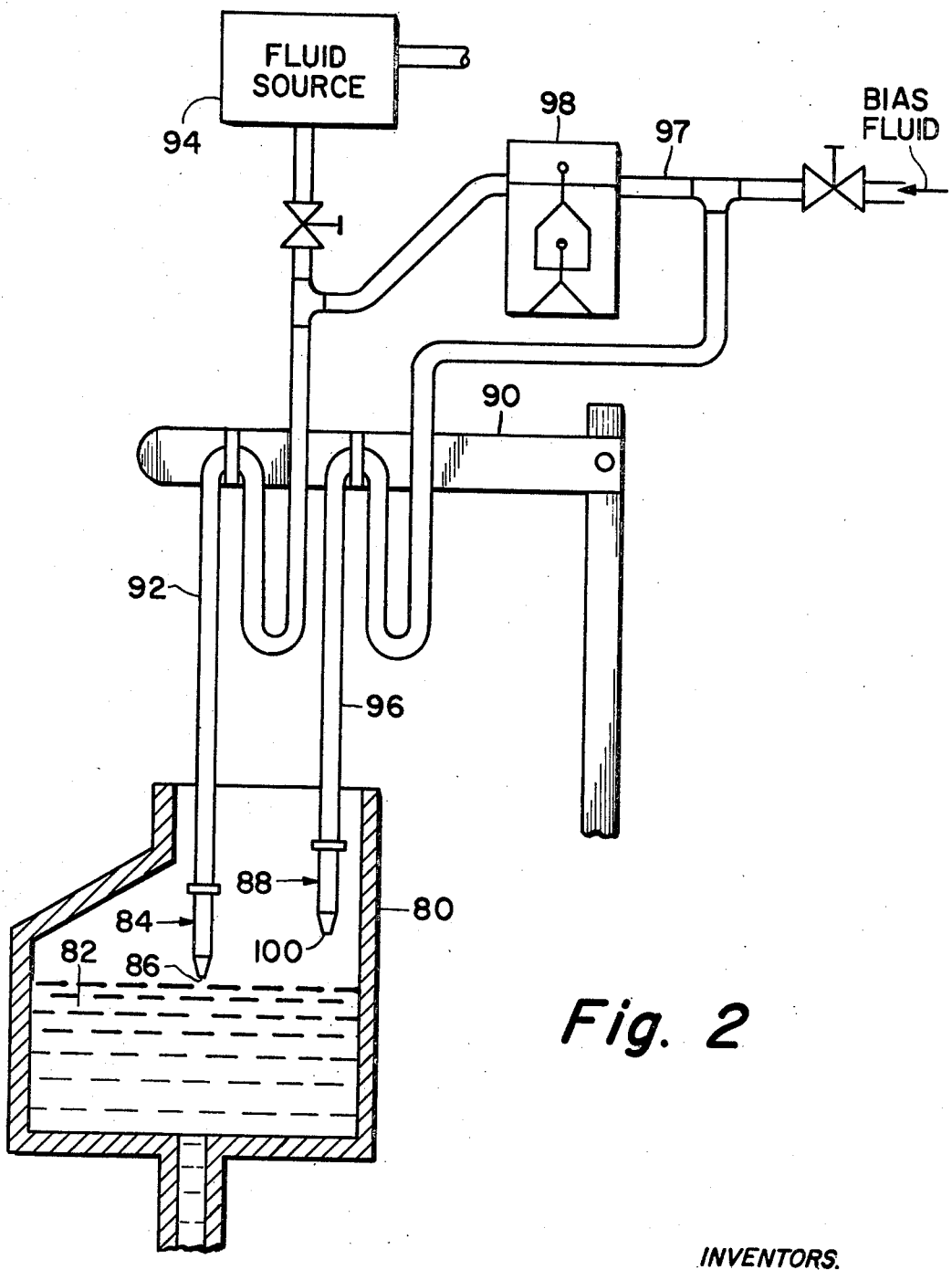
FIGURE 2 illustrates schematically means for reducing errors in the sensing system of the instant invention caused by nozzle pressure variations resulting from temperature changes.

Referring to FIGURE 2 there is shown in a second embodiment of the instant invention a melt furnace 80 containing a quantity of liquidous molten material 82, such as glass at a temperature in excess of 800° C. or the like. A liquid level sensing element 84 in a form as previously described is suspended above the surface of the material 82 so as to issue a fluid sream from an outlet orifice 86 downwardly toward the surface of the material 82. A temperature error compensating element 88 being substantially identical to the element 84 is suspended in the furnace 80 preferably in close proximity to the element 82 so as to be subject to the same temperature conditions.

The element 84 is suspended from a vertically movable mounting member 90 by a flexible fluid conducting conduit 92. Fluid is supplied to the element 84 from a constant pressure source 94. The element 88 is similarly suspended from the member 90 and is fed with fluid from the flexible line 96 attached to the bias line 97 of a Schmitt trigger 98. An output orifice 100 of the element 88 issues fluid downwardly toward the material 82 from a level above that of the orifice 86. It is necessary only that there be some back pressure produced in the element 88 when there is back pressure developed in the element 84. A difference in level between the orifices 86 and 100 of the order of ¼ inch to about 1 inch is suitable although greater or lesser differences are satisfactory under many circumstances. Because of this difference in level between the orifices 86 and 100, back pressure developed in the element 84 and conduit 92 is always greater than back pressure developed in the element 88 to the extent that the net difference is sufficient to trigger the amplifier 98 when the orifice 86 is sufficiently close to the surface of the material 82. Other elements of the monitoring system of the instant example, not shown, are the same as those previously described in the first example.

Temperature change occurring in the furnace 80 may be sufficient to cause expansion or contraction of the element 84. Such a dimensional change is likely to result in a change in the back pressure response characteristics of the element 84. Should this happen the switching characteristics of the monitoring system as a whole would be altered were it not for the presence of the element 88 in the same temperature environment. In the instant example both elements 82 and 88 produce similar back pressure changes due to the temperature changes of their environment and these back pressures changes are substantially reduced by the balancing function of the trigger 98. Accordingly, only the changes in the pressure differential between the elements 82 and 88 which are attributable to a change in the level of the orifice 86 above the material 82 causes switching of the trigger 98.

We claim:
1. A surface level sensing system comprising
    nozzle means for issuing a fluid stream downwardly toward a liquid surface, said stream being of laminar flow profile when undisturbed by said surface,
    means for conducting said fluid, under pressure, to said nozzle means, said conducting means being flexible over at least a portion of its length,
    means for supplying said fluid to said conducting means at a substantially constant pressure,
    a fluidic Schmitt trigger responsively connected to said conducting means for emitting a fluid signal from a first output port when the pressure of said fluid in said conducting means is greater than a predetermined reference pressure, and from a second output port when the pressure of said fluid in said conducting means is less than said reference pressure,
    a pressure sensitive switch responsively connected to said trigger, said switch being in a first position when said trigger emits said signal from said first output port and in a second position when said trigger emits said signal from said second output port,
    a reversible electric motor,
    relay means connected in energizing relation to said switch for applying driving power to said motor, the polarity of said power applied to said motor being such as to rotate said motor in said first direction when said switch is in said first position and in an opposite direction when said switch is in said second position,
    a rack and pinion assembly responsively connected to said motor for lifting said nozzle means when said motor rotates in said first direction and lowering said nozzle means when said motor rotates in said opposite direction,
    an electrical potentiometer for indicating the level of said surface, said potentiometer having a movable contact responsively connected to said motor, a reference potential applied across said potentiometer corresponding to a predetermined reference level of said surface, the voltage between said contact and one side of said potentiometer corresponding to the level of said surface in relation to said reference level.

2. A continuously oscillating surface level sensing system comprising
    a movable sensing nozzl for issuing a fluid stream toward the surface of a material,
    means for conducting said fluid, under pressure, to said nozzle,
    means for supplying said fluid to said conducting means at a substantially constant pressure,
    a fluid responsive device communicating with said sensing nozzle for providing a first output signal initiated in response to the fluid back pressure in said sensing nozzle as said back pressure increases in value to a first predetermined level, and a second output signal initiated in response to said back pressure as said back pressure decreases in value to a second predetermined level, said first level being greater than said second level, and
    means responsive to said device for lifting said nozzle away from said surface in response to said first signal, and for lowering said nozzle toward said surface in response to said second signal.

3. The sensing system of claim 2 wherein said fluid responsive device comprises a bistable fluid amplifier, having a first control port communicating with said sensing nozzle and a second control port biased at a predetermined pressure value.

4. The sensing system of claim 2 further comprising means responsively connected to said lifting means for indicating the level of said surface.

5. The sensing system of claim 2 wherein said lifting means comprises
    a reversible motor, and
    means responsively connected to said fluid responsive device for reversing the direction of rotation of said motor in response to the initiation of said first and second output signals.

6. The sensing system of claim 3 further comprising a temperature compensating nozzle communicating with said second control port for issuing a stream of fluid toward said surface, said compensating nozzle having a substantially identical back pressure response characteristic as said sensing nozzle and being disposed at a fixed distance above said sensing nozzle in substantially the same thermal environment, said compensating nozzle being supported by said lifting means.

7. The sensing system of claim 4 wherein said indicating means comprises an electrical potentiometer having a movable contact responsively coupled to said lifting means, a voltage applied across said potentiometer corresponding to a predetermined reference level of said sensing nozzle, the voltage between said movable contact and one side of said potentiometer corresponding to the level of said sensing nozzle in relation to said reference level.

References Cited
UNITED STATES PATENTS

| | | | |
|---|---|---|---|
| 2,398,958 | 4/1946 | Pellettere | 73—290 |
| 3,100,347 | 8/1963 | Fritz | 73—304 X |
| 3,213,670 | 10/1965 | Macgeorge | 73—290 X |
| 3,285,608 | 11/1966 | Lyman | 73—37.7 X |
| 2,891,686 | 6/1959 | Robertson. | |

S. CLEMENT SWISHER, Primary Examiner